(12) United States Patent
Eltvedt

(10) Patent No.: US 6,279,733 B2
(45) Date of Patent: Aug. 28, 2001

(54) CONVEYOR BELT TENSIONING AND TRACKING SYSTEMS

(76) Inventor: Frank A. Eltvedt, 3902 Ravenglass Ridge Rd., Crystal Lake, IL (US) 60012

( * ) Notice: Subject to any disclaimer, the term of this patent is extended or adjusted under 35 U.S.C. 154(b) by 0 days.

(21) Appl. No.: 09/740,454

(22) Filed: Dec. 19, 2000

Related U.S. Application Data

(63) Continuation of application No. 09/235,772, filed on Jan. 22, 1999.

(51) Int. Cl.[7] .......................... B65G 23/44; B65G 39/071

(52) U.S. Cl. .......................... 198/816; 198/813; 198/806

(58) Field of Search ................................... 198/806, 813, 198/816

(56) References Cited

U.S. PATENT DOCUMENTS

| | | | |
|---|---|---|---|
| D. 248,225 | 6/1978 | Casteel | D12/58 |
| D. 309,817 | 8/1990 | Burkett | D34/29 |
| D. 366,101 | 1/1996 | Eltvedt | D23/266 |
| 704,388 | 7/1902 | Schwingel . | |
| 1,456,726 * | 5/1923 | Fraley | 198/816 |
| 1,781,424 | 11/1930 | Anderson . | |
| 1,792,195 | 2/1931 | Stresau . | |
| 1,913,040 | 6/1933 | Pierson . | |
| 1,937,925 | 12/1933 | Tolf | 198/139 |
| 2,768,732 | 10/1956 | Muhlenbruch | 198/139 |
| 2,919,013 | 12/1959 | Culpepper | 198/139 |
| 2,939,571 | 6/1960 | Robertson | 198/208 |
| 3,433,347 | 3/1969 | Molins et al. | 198/69 |
| 3,593,591 | 7/1971 | Chantland | 74/242.15 R |
| 3,620,139 | 11/1971 | Kulwicki . | |
| 3,888,343 | 6/1975 | Snyder | 198/127 R |
| 3,923,148 | 12/1975 | Dorner | 198/75 |
| 4,007,827 | 2/1977 | Mattos | 198/862 |
| 4,034,846 | 7/1977 | Burgis et al. | 198/422 |
| 4,185,908 | 1/1980 | Taylor et al. | 355/3 R |
| 4,203,696 | 5/1980 | Lindberg | 414/331 |
| 4,237,786 | 12/1980 | Sanford | 101/378 |
| 4,277,216 | 7/1981 | Lindberg | 414/331 |
| 4,295,815 | 10/1981 | Eltvedt | 425/556 |
| 4,311,492 | 1/1982 | Eltvedt | 55/158 |
| 4,387,064 | 6/1983 | Werderitch et al. | 264/40.1 |
| 4,511,028 | 4/1985 | Meister | 198/497 |
| 4,560,070 | 12/1985 | Cribiu' et al. | 209/664 |
| 4,620,923 | 11/1986 | Meister | 209/223 R |
| 4,727,981 | 3/1988 | Johansson | 198/841 |
| 4,741,687 | 5/1988 | Eltvedt | 425/441 |
| 4,750,996 | 6/1988 | Meister | 209/223.1 |
| 4,754,867 | 7/1988 | De Anda | 198/464.2 |
| 4,823,940 | 4/1989 | Cretser | 198/817 |
| 4,964,498 | 10/1990 | Klingl | 198/347.1 |
| 4,993,542 | 2/1991 | Nomura | 198/816 |
| 5,009,306 | 4/1991 | Roderick et al. | 198/414 |
| 5,022,514 | 6/1991 | Lofberg | 198/813 |
| 5,074,402 | 12/1991 | Bender-Zanoni et al. | 198/626.1 |
| 5,101,980 * | 4/1992 | Arvidson | 198/813 |
| 5,131,529 | 7/1992 | Dorner | 198/835 |
| 5,156,260 | 10/1992 | Dorner et al. | 198/813 |

(List continued on next page.)

FOREIGN PATENT DOCUMENTS

2069553 * 12/1992 (CA) ..................... 198/816

*Primary Examiner*—Christopher P. Ellis
*Assistant Examiner*—Mark A. Deuble
(74) *Attorney, Agent, or Firm*—Wallenstein & Wagner, Ltd.

(57) ABSTRACT

A tensioning and tracking system with specific useful features for adjusting a conveyor belt is disclosed. Generally, the tensioning and tracking systems include a pair of plate members attached together and defining a channel and an elongated opening. Mounted within the channel is a slide plate having a distal end. Also, connected to one of the side plate members is a rotating member for reciprocally advancing the distal end of the slide plate into the elongated opening. The position of the slide plate within the elongated opening is secured by a locking screw connected to one of the plate members.

21 Claims, 6 Drawing Sheets

U.S. PATENT DOCUMENTS

| | | | |
|---|---|---|---|
| 5,156,261 | 10/1992 | Dorner | 198/816 |
| 5,174,435 | 12/1992 | Dorner et al. | 198/806 |
| 5,191,962 | 3/1993 | Wegscheider et al. | 198/415 |
| 5,203,447 | 4/1993 | Ewert | 198/807 |
| 5,265,714 | 11/1993 | Hansen | 198/832 |
| 5,302,077 | 4/1994 | Sato et al. | 414/609 |
| 5,609,238 * | 3/1997 | Christensen | 198/816 |
| 5,947,263 | 9/1999 | Uber et al. | 198/813 |

* cited by examiner

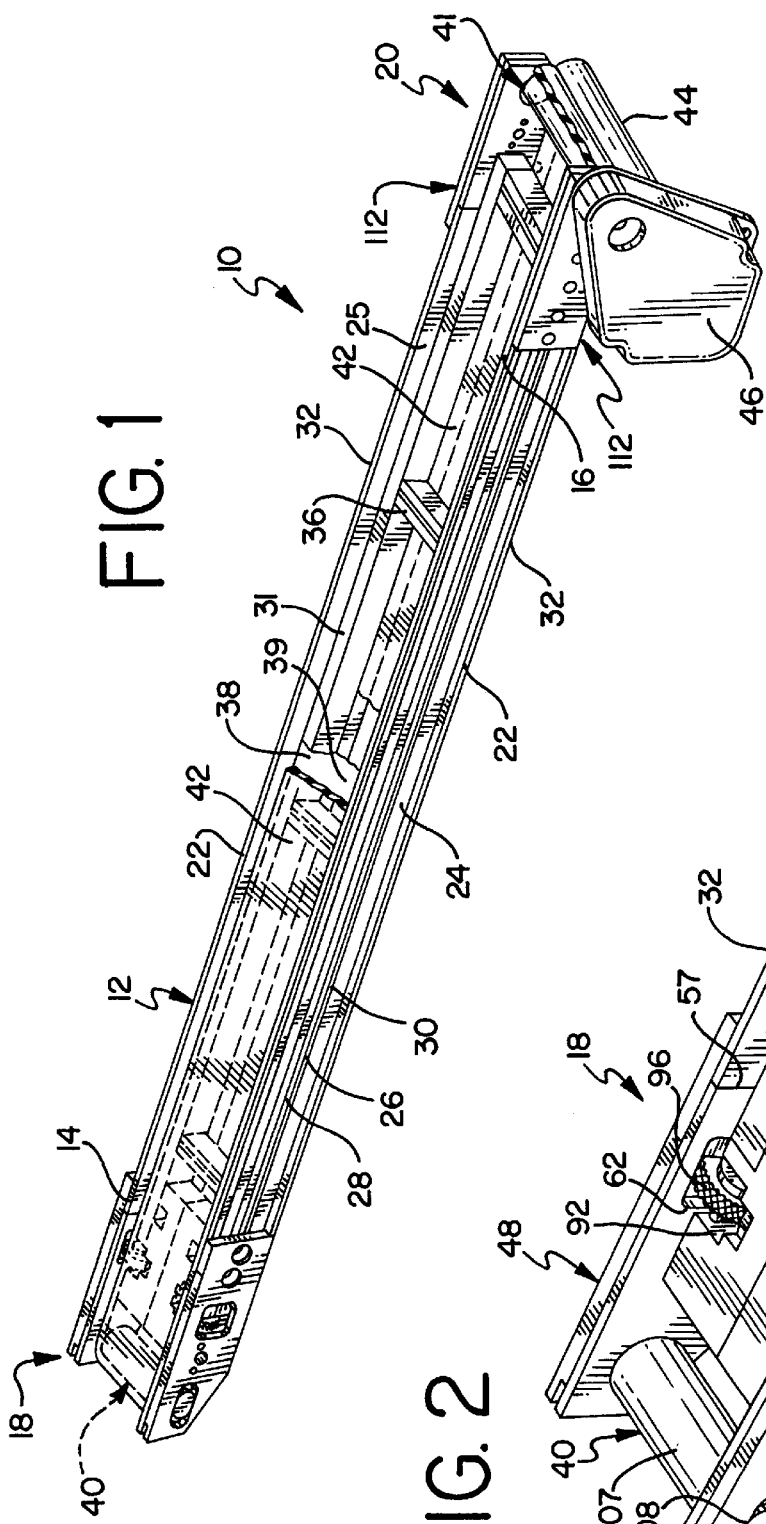

CONVEYOR BELT TENSIONING AND TRACKING SYSTEMS

This Application is a continuation of co-pending prior U.S. application Ser. No. 09/235,772 filed Jan. 22, 1999.

DESCRIPTION

1. Technical Field

The present invention generally relates to systems for adjusting the tension and tracking of an endless belt, and in particular to systems that provide for easy and quick adjustments.

2. Background Art

In many conveyors available today, belt tensioning and tracking mechanisms are combined by journaling the ends of a pulley in blocks that are slidably mounted to the conveyor's frame. Accordingly, these mechanisms provide for adjustments to the tension and tracking of the conveyor belt by adjusting the position of the slide blocks. However, in mechanisms of this type, an adjustment to the belt tracking effects the tensioning, and vice versa. Accordingly, trained personnel are required for properly adjusting the belt's tension and tracking.

Moreover, many conveyors are used in applications wherein, if the length of the conveyor is changed, then other automated production equipment connected to the conveyor must also be repositioned to accommodate the change in length. In addition, after each adjustment to the conveyor belt, many tensioning and tracking mechanisms require that an excessive number of bolts and screws be tightened for securing the position of the conveyor's pulleys.

Also, few conveyors provide for easy removal and replacement of the belt during maintenance. Instead, many conveyors require a time consuming process wherein several parts must be removed before the belt.

Hence, the present invention overcomes the above discussed deficiencies of the prior art.

SUMMARY OF THE INVENTION

Generally, the tensioning and tracking systems of the present invention include a pair of plate members attached together and defining a channel and an elongated opening. Mounted within the channel is a slide plate having a distal end. Also, connected to one of the side plate members is a rotating member for reciprocally advancing the distal end of the slide plate within the elongated opening. The position of the slide plate being secured by a locking screw connected to one of the plate members.

Other advantages and features of the present invention will be apparent from the following description of specific embodiments illustrated in the accompanying drawings.

BRIEF DESCRIPTION OF DRAWINGS

FIG. 1 is a fragmentary top perspective view, partially in phantom, of a conveyor having tensioning and tracking systems in accordance with the present invention;

FIG. 2 is a top perspective view of the tensioning system shown in FIG. 1;

DETAILED DESCRIPTION

Figure 3:
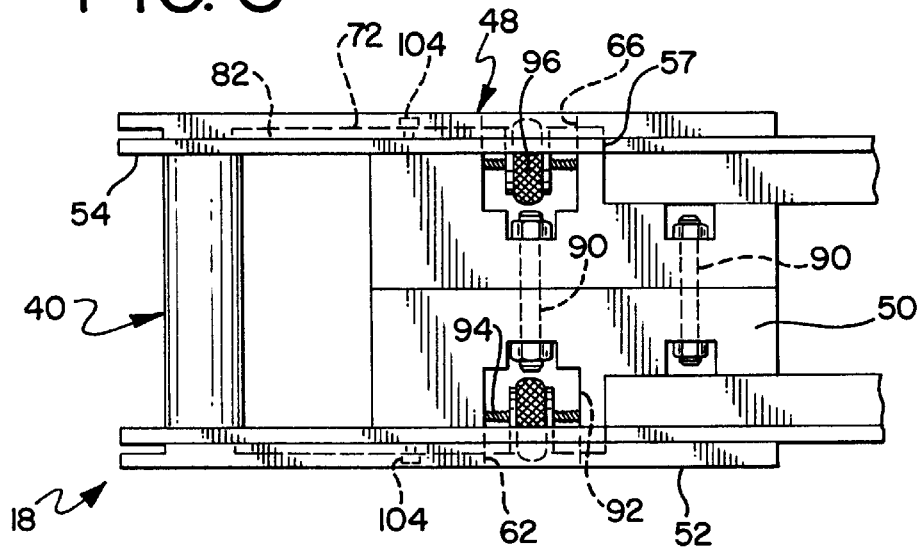
FIG. 3 is a top view, partially in phantom, of the tensioning system depicted in FIG. 1 having a pair of tensioning assemblies attached to a pair of connecting blocks.

While this invention is susceptible of embodiments in many different forms, there is shown in the drawings and will herein be described in detail preferred embodiments of the invention. The present disclosure is to be considered as an exemplification of the principles of the invention and is not intended to limit the broad aspects of the invention to the embodiments illustrated.

Referring now to the drawings, and particularly to FIG. 1, a conveyor 10 is depicted having an elongated frame 12. Attached to the ends 14 and 16 of the frame 12 is a belt tensioning system 18 and a belt tracking system 20, respectively.

Preferably, the frame 12 is defined by a pair of spaced parallel side rails 22 formed of extruded aluminum. The side rails 22 are similar to each other and include an outer face 24 and an inner face 25. The outer face 24 of each rail 22 has a longitudinal slot 26 extending the rail's length. The slot 26 is bordered by an upper lip 28 and a lower lip 30. The slot 26 projects within a convex beam portion 31 protruding from the inner face 25 and extending the length of the rail 22. Furthermore, the longitudinal edges of each rail 22 include a pair of parallel longitudinal flanges 32 extending perpendicularly from face 24.

Mounted between the side rails 22 are one or more spares 36 and a bed plate 38 having an upper planar surface 39. The spares 36 provide support for the bed plate 38. The spares 36 are preferably formed of aluminum or an aluminum alloy and are attached to the beam portions 31 of the side rails 22 by screws or the like received within tapped holes in the ends of each spare. Furthermore, bed plate 38 tightly fits between the rails 22 and is attached by bolts to the spares 36.

As explained in detail further herein, mounted to the belt tensioning system 18 and the belt tracking system 20 are a pair of pulley assemblies 40 and 41, respectively. Preferably, 40 is an idler pulley assembly and 41 is a drive pulley assembly. Trained over the pulleys 40, 41 is an endless conveyor belt 42 with a portion of the belt laying on the upper support surface 39 of the bed plate 38.

A power source 44 is operably connected to the drive pulley 41 for rotating the conveyor belt 42. The power source 44 can comprise of, for example, an electric motor connected to the drive pulley 41 by a drive belt (not shown) and protected by a cover 46.

Turning to FIGS. 2–5, and as indicated above, the belt tensioning system 18 is mounted to one end of the conveyor 10. The belt tensioning system 18 includes a pair of tensioning assemblies 48 having a fixed pair of connecting blocks 50 along with pulley assembly 40 mounted therebetween. The tensioning system 18 provides for selectively positioning the pulley 40 along the longitudinal axis of the conveyor 10 defined by the conveyor side rails 22.

Figure 4:
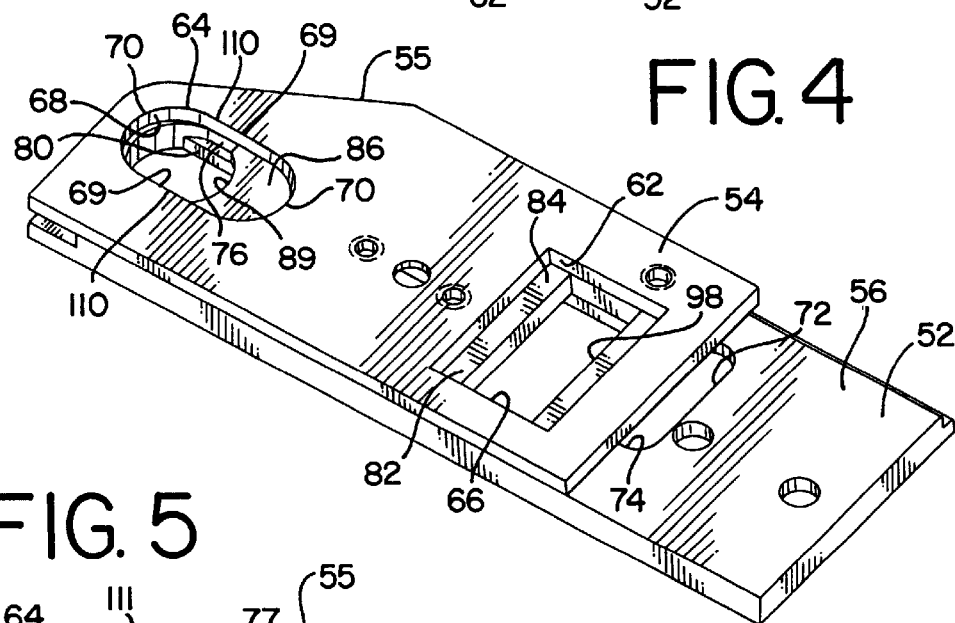
FIG. 4 is a perspective view of one tensioning assembly removed from the conveyor of FIG. 1.
Figure 5:
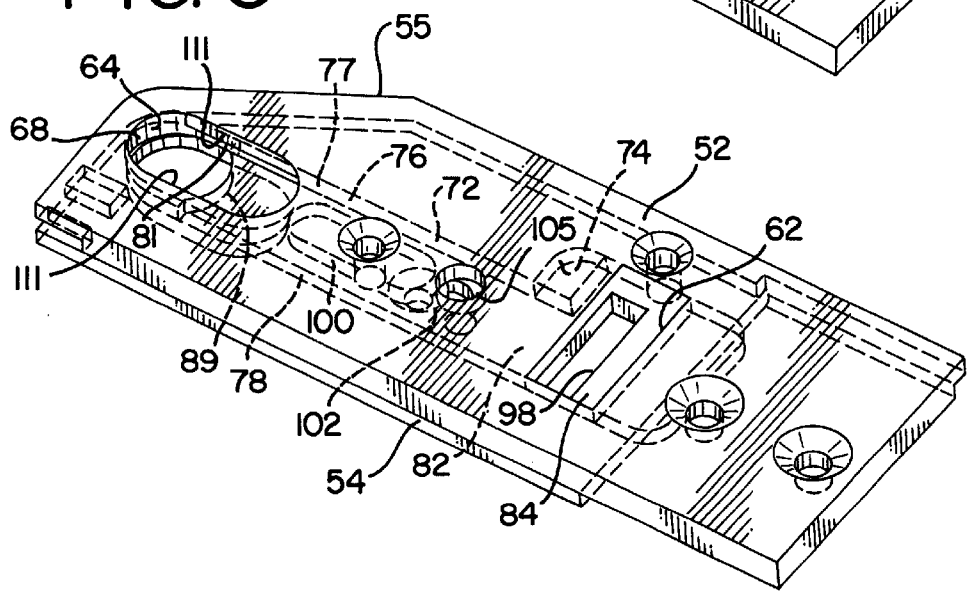
FIG. 5 is a perspective view, partially in phantom, of the other tensioning assembly removed from the conveyor of FIG. 1.

As shown in the FIGURES, and particularly FIGS. 4 and 5, each tensioning assembly 48 includes an outer plate member 52 and an adjoining co-planar inner plate member 54 made of aluminum, stainless steel, or other like material. The outer perimeter dimensions of the plate members 52, 54 are substantially the same except the length of the inner plate 54 is shorter than the outer plate 52. Both plate members 52,54 preferably have two horizontal walls, two vertical walls, and a beveled end wall 55 to facilitate removal and installation of the conveyor belt. Moreover, each plate member 52,54 has a planer outer surface and a co-planer inner surface 56.

The plate members 52,54 of each belt tensioning assembly 48 are attached to one of the side rails 22 wherein a portion of the outer plate member 52 adjoins against the rail's outer face 24. In addition, the planar vertical end wall 57 of each belt tensioning assembly inner plate member 54 adjoins against the planar terminal end surface of a respective rail 22 for providing stability of the tensioning assembly. Likewise, the inner surface of the outer plate 52 can include at least one groove 58 (FIG. 8) for receiving and adjoining against one of the rail's longitudinal flanges 32. The outer plate member 52 is bolted onto the rail 22 wherein, preferably, nuts or a block (not shown) are received within the slot 26 and engage the slot's upper and lower lips 28,30 during tightening of the bolts.

Extending through both plate members 52,54 is a generally rectangular opening 62 and an elongated opening 64. Preferably, when the plates 52,54 are attached together by screws, rivets or similar means, the rectangular openings 62 within the plates are aligned to provide a window 66 extending through each tensioning assembly 48. Similarly, the elongated openings 64 within each plate member 52,54 are also aligned to provide an open guide slot 68 through each tensioning assembly 48. Each guide slot 68 preferably has two parallel sides 69 and two arcuate ends 70 for limiting the travel of the pulley assembly 40 and thus maintaining the pulley within the slot even when the belt is removed.

As shown in FIGS. 3, 4 and 5, defined within the inner surface 56 of outer plate 52 is a channel 72 extending about the rectangular opening 62 and the elongated opening 64 of the outer plate. The channel 72 has an enlarged portion 74 about the rectangular opening 62 and a passage 76 extending from the enlarged portion 74 of the channel 72 and along the sides of the elongated opening 64. The passage 76 has two longitudinal side walls 77,78 in parallel spaced relationship to each other with opening 64 therebetween. Accordingly, a pair of spaced parallel lips 80,81 are provided about the opening 64 in the outer plate member 52.

Channel 72 receives a generally L-shaped slide plate 82 having a thumb wheel cooperating portion 84 and a beam portion 86 integrally connected to each other. The cooperating portion 84 is generally rectangular and is dimensioned to fit, and longitudinally side, within the enlarged portion 74 of the channel 72. Likewise, the beam portion 86 of the slide plate 82 slidingly engages the side walls 78,80 of the channel passage 76. Accordingly, the side walls 78,80 provide lateral support of the slide plate beam portion 86 along the entire length of one side 87 of the plate 82 an a substantial portion of the other side 88.

The distal end 89 of the slide plate 82 opposite the thumb wheel cooperating portion 84 is concave. The slide plate 82 is longitudinally moveable within channel 72 for adjustably positioning its distal end 89 within the elongated opening 64 of the tensioning assembly 48. The slide plate 82 is dimensioned to slide within the elongated portion 74 of the channel 72 and against the inner surface of the inner plate 54. Accordingly, the elongated portion 74 of the channel 72 and the inner surface of the inner plate 54 define a cavity wherein only longitudinal movement of the slide plate 82 is permitted.

FIGS. 2 and 3 depict the connecting blocks 50 attached to the tensioning assemblies 48. Preferably, each connecting block 50 is attached by screws or the like to the inner plate 54 of a respective tensioning assembly 48. Likewise, the connecting blocks 50 are attached to each other by bolts 90.

Defined within each connecting block 50 is a notch 92 that adjoins the window 66 of an associated tensioning assembly 48. Attached to each block 50 within notch 92 is a threaded shaft 94 with a rotational member consisting of a thumb wheel 96 rotatably coupled thereto. The shaft 94 is in parallel alignment with the longitudinal axis of the conveyor 10. Moreover, a portion of the thumb wheel 96 projects through both the window 66 and an aperture 98 within the cooperating portion 84 of the side plate 82. Accordingly, rotation of the thumb wheel 96 provides a user with leverage in longitudinally advancing the slide bar 82 within the channel 72 of the respective tensioning assembly 48.

Figure 13:
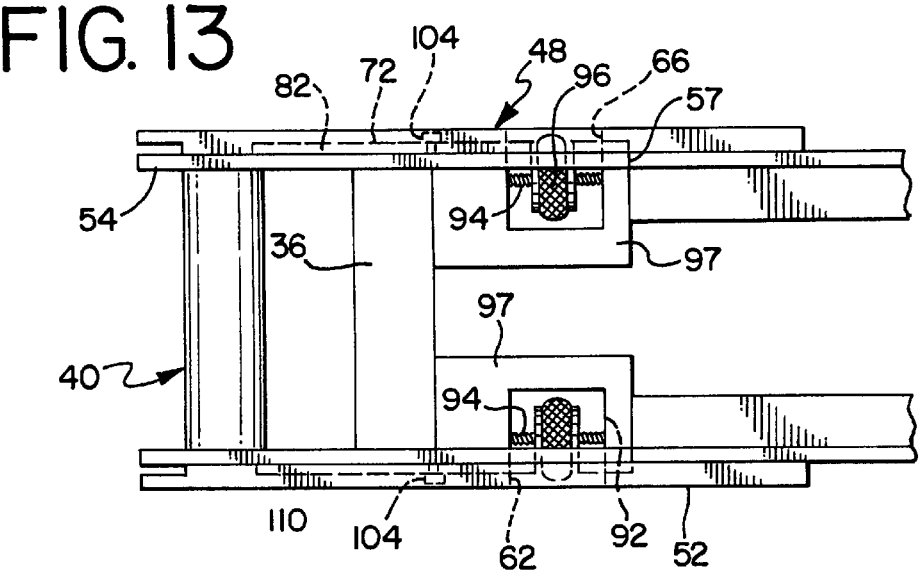
FIG. 13 is a top view, partially in phantom, of an alternative embodiment of the tensioning assemblies of FIG. 1.

In an alternative embodiment shown in FIG. 13, each connecting block can be substituted with a generally U-shaped block or housing 97 attached be screws to the inner plate 54 of each tensioning assembly 48. Like the connecting blocks, a threaded shaft 94 with a thumb wheel 96 is coupled to the housing 97. Furthermore, the two tensioning assembly housings 79 within the tensioning system are attached to each other by a crossbar or spare 36.

Figure 14:
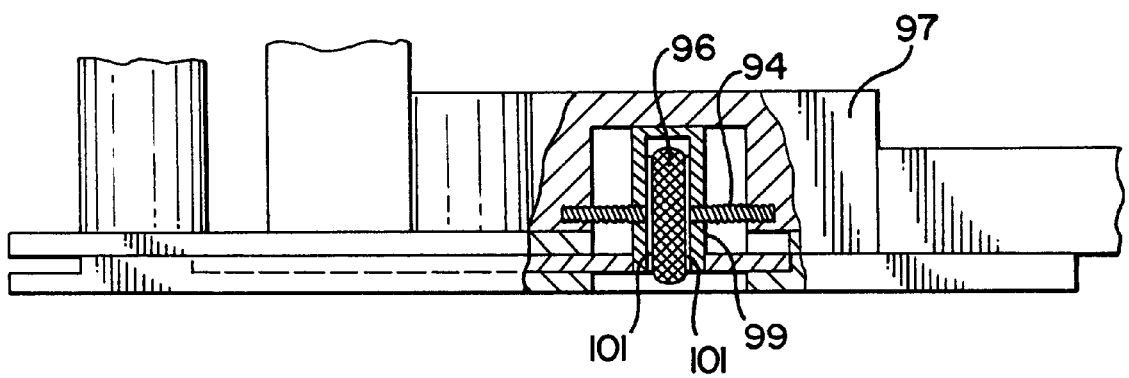
FIG. 14 is a fragmentary view of yet another alternative embodiment of the tensioning assemblies of FIG. 1, having a clip for receiving the thumb wheel.
Figure 15:
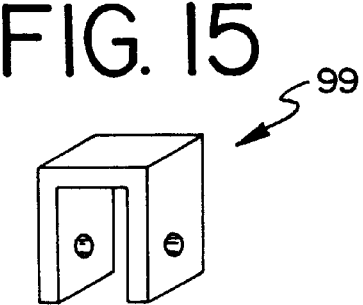
FIG. 15 is a perspective view of the clip depicted in FIG. 14.

As shown in FIGS. 14 and 15, in yet another embodiment, a U-shaped clip 99 preferably made of plastic can be implemented for receiving the thumb wheel 96 of each tensioning assembly 48. The clip 99 prevents washers 101 that adjoin each side of thumb wheel 96 from being chocked.

As depicted in FIG. 5, defined within the beam portion 86 of each slide plate 82 is a longitudinal slot 100 having a narrow open portion 102. Received within the narrow open portion 102 is the threaded shaft of a locking screw 104 (FIG. 3) threadingly coupled to the inner plate 54 of the tensioning assembly 48. The head of the locking screw 104 is accessed through an aperture 105 in the outer plate member. The head of the locking screw 104 is too large to pass through the narrow open portion 102 of the slot 100. This allows for fixing the position of the slide plate 82, and in particular its distal end 88, by tightening the head of the locking screw 104 against the planar surface of the slide plate.

Figure 9:
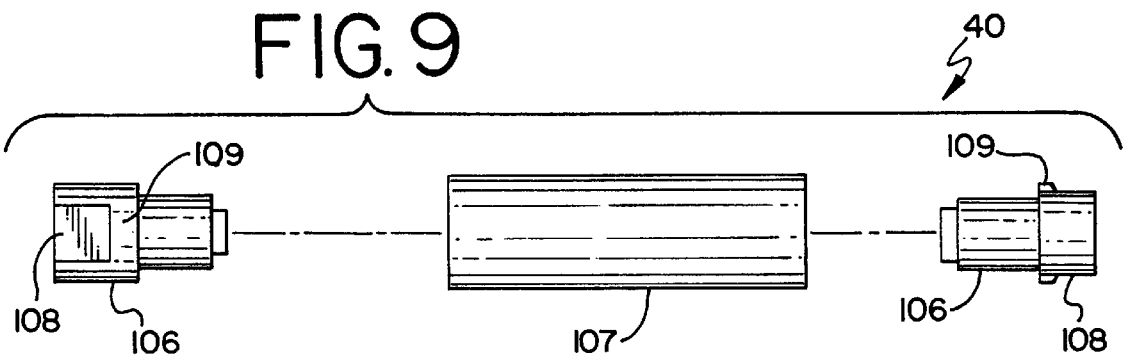
FIG. 9 is an exploded side view of the pulley rotatably connected to the tensioning assemblies of FIG. 1.

As shown in FIG. 2, received within the elongated guide aperture 64 of each tensioning assembly 48 is a generally cylindrical sleeve 106 which is part of the pulley assembly 40 also depicted in FIG. 9. The sleeves 106 are rotatably mounted to the ends of the pulley assembly spindle 107 by radial bearings located within the confines of the spindle.

The outer end of each sleeve 106 includes a pair of opposed flats 108 in co-planar spaced relationship with each other. Preferably, the flats 108 extend from the distal end of each sleeve 106 to a distance short of the spindle 107 such that a portion 109 of the sleeve's arcuate surface is therebetween.

The flats 108 are slidingly engaged by the parallel side walls 110 of the elongated opening 64 in the outer plate member 52 for preventing rotation of the sleeve 106 relative to the tensioning assemblies 48. However, the portions 109 of the sleeve's arcuate surface between the flats 108 and the spindle 107 are slidingly engaged by parallel side walls 111 of the elongated opening 64 in the inner plate member 54. Accordingly, the spacing between the parallel walls 110 of the slot opening in the outer plate member 52 is less than the spacing between like walls 111 in the inner plate 54.

The sleeve 106 is also abutted by the concave end 88 of the slide plate 82. Accordingly, movement of each slide plate 82 within each tensioning assembly 48 results in like movement of one end of the pulley assembly 40. Therefore, rotation of both thumb wheels 96 moves the spindle 40 for tightening the belt 42 trained over the pulley assembly 40. However, adjusting the position of the spindle 40 does not change the overall length of the sides of the conveyor. Moreover, the slide plates 83 are sliding engaged by the lips 80,81 about the elongated openings 64 in the tensioning assemblies 48 to provide additional stability of the pulley assembly 40.

Turning back to FIG. 1, and as indicated above, the belt tracking system 20 is mounted to end 16 of the conveyor 10 opposite the belt tensioning system 18. The belt tracking system 20 includes a pair of tracking assemblies 112 having pulley assembly 41 therebetween. Also, if desired a spare, 36 can be attached between the tracking assemblies 112. Like the tensioning system 18, the tracking system 20 provides for selectively positioning the pulley 41 along the longitudinal axis of the conveyor 10.

Figure 6:
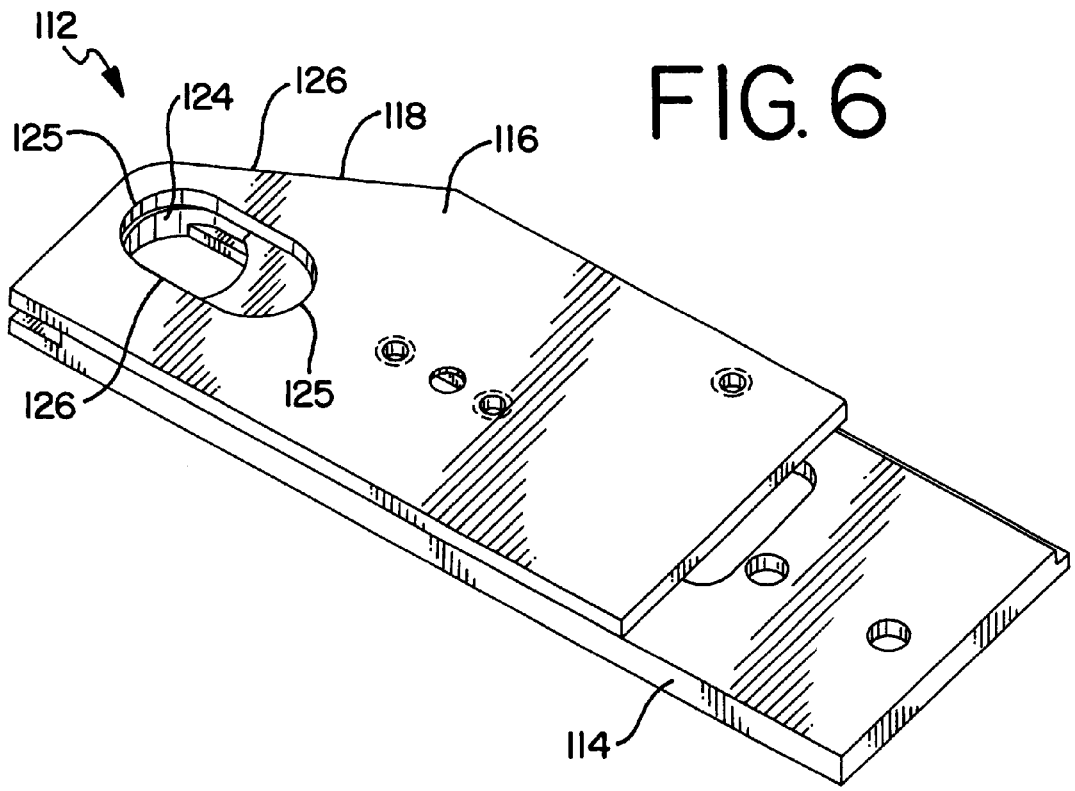
FIG. 6 is a perspective view of one tracking assembly within the tracking system of FIG. 1.
Figure 7:
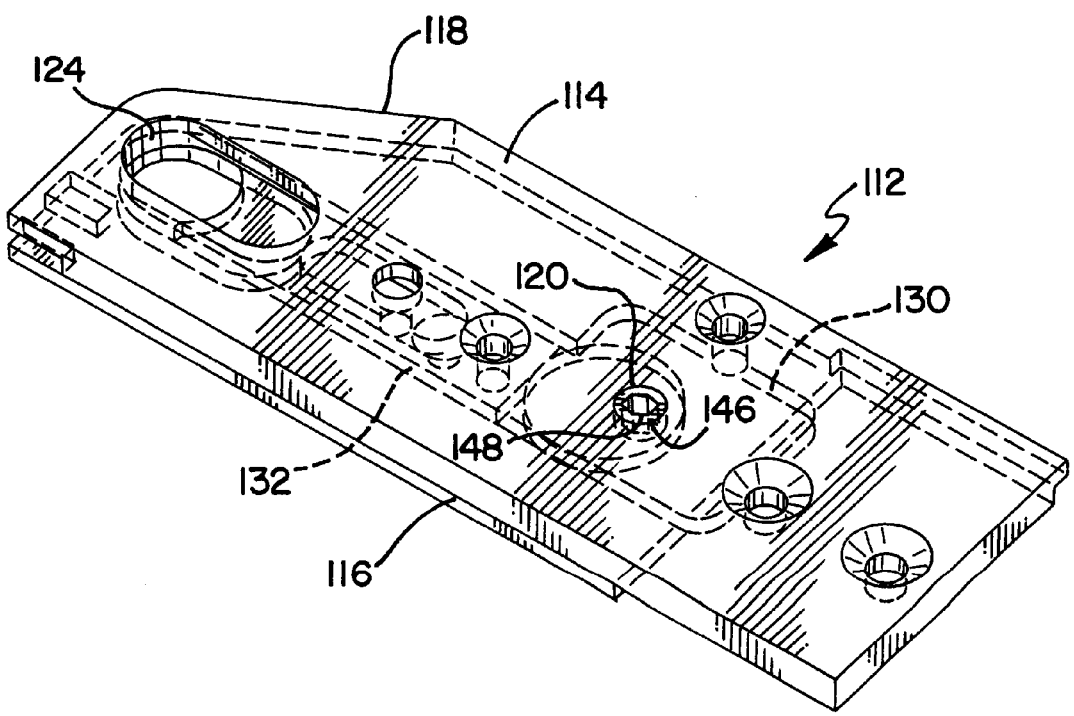
FIG. 7 is a perspective view, partially in phantom, of the other tracking assembly within the tracking system of FIG. 1.
Figure 8:
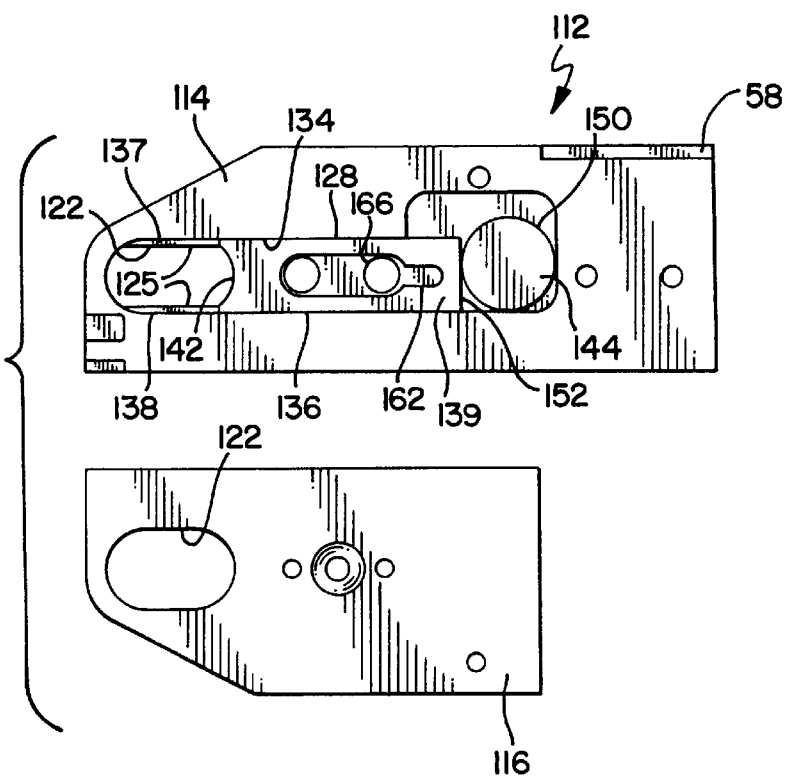
FIG. 8 is an assembly view of the tracking assembly of FIG. 6.

As shown in FIGS. 6–8, and similar to the tensioning assemblies 48 within the tensioning system 18, each tracking assembly 112 includes an outer plate member 114 and an a co-planar inner plate member 116 that are attached together by screws, rivets, or other like conventional means. The perimeter of the plate members 114,116 are substantially similar except for the inner plate 116 having a shorter length than the outer plate 114. Preferably, both plate members 114,116 also include a beveled end wall 118 for ease in removing and replacing the conveyor belt.

Each belt tracking assembly 112 is attached to one of the side rails 22 wherein a portion of the outer plate member 114 abuts the outer face 24 of the rail. The outer plate member 114 to each of the belt tracking assemblies is attached to a respective side rail 22 by bolts that are threaded onto nuts or a block (not shown) engaging the upper and lower lips 28,30 within slot 26. Moreover, the inner plate member 116 of each belt tracking assembly abuts against the end surface of the rail 22.

Passing through both the outer and inner plate members 114,116 is an elongated opening 122. Moreover, a generally annular opening 120 extends through the outer plate member 114. The elongated apertures 122 within each plate 114,116 are aligned when the plates are attached together to provide an open guide slot 124 through each tracking assembly 112. The guide slot 124 is similar to the tensioning guide slot 68 and includes two parallel sides 125 and two arcuate ends 126.

As depicted in FIGS. 7 and 8, within the inner surface 127 of the outer plate 114 is a channel 128 similar to the channel 72 within each tensioning assembly. The channel has an enlarged portion 130 about the annular opening 120 and a passage 132 extending from the enlarged portion 130 of the channel 128 and along the sides 125 of the elongated opening 122. The passage 132 has two parallel longitudinal side walls 134,136 with aperture 122 located between the side walls to provide a pair of spaced parallel lips 137,138.

A slide plate 139 having a proximal end 140 and a distal end 142 is received within the channel 128. The slide plate 139 is generally rectangular except for distal end 142 being concave. The slide plate 139 is allowed to longitudinally side within passage 132 with side walls 140,141 for providing lateral support along one entire side of the slide plate and a substantial portion of the other side.

Received within the enlarged portion 130 of the channel 128 is a rotating member consisting of a cam 144 having a cylindrical pivot 146 projecting from one side. The pivot 146 is received by the annular opening 120 through the outer plate 114. The distal end of the pivot 146 has a hexagonal socket 148 for receiving the end of an Allen wrench for rotating the cam 144 about the pivot. The outer perimeter surface 150 of the cam 144 abuts against the planar proximal end 152 of the slide plate 139 opposite its distal end. Accordingly, the cam 144 provides a user with leverage for moving the slide plate 139 wherein rotation of the cam results in longitudinal axial movement of the slide plate within the passage of the tracking assembly.

Figure 11:
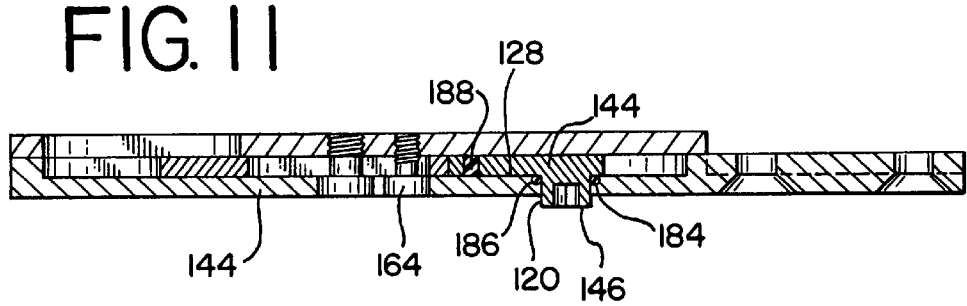
FIG. 11 is a cross-sectional view of the tracking assembly of FIG. 7.

As illustrated in FIGS. 8 and 11, formed within the slide plate 139 of each tracking assembly 112 is a longitudinal open slot having a narrow portion 162. Received within narrow portion 162 is the threaded shaft of a locking screw 164 coupled to the inner plate of the tracking assembly 112. However, the head of the locking screw 164 is too large to pass through the narrow portion 162. Accordingly, the locking screw 164 provides for adjustably fixing the position of the slide plate 139 by tightening the head of the screw against the planar surface of the slide plate wherein access to the screw is provided by opening 166 within outer plate member 114.

Figure 10:
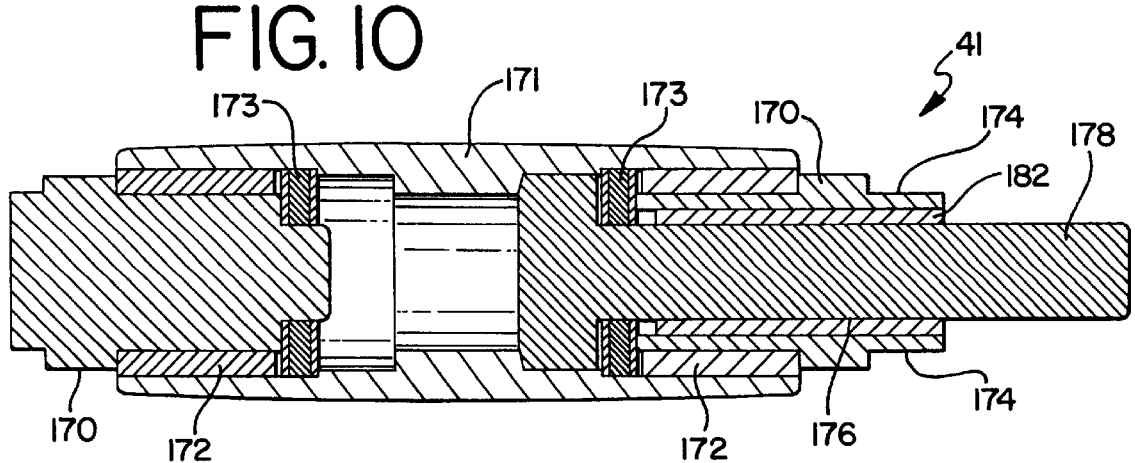
FIG. 10 is a cross-sectional view the pulley rotatably connected to the tracking assemblies of FIG. 1.

As depicted in FIGS. 1 and 10, drive pulley assembly 41 is mounted to the tensioning assemblies 112. The drive pulley assembly 41 includes a generally cylindrical sleeve 170 rotatably mounted to one end of spindle 171 and received within the elongated guide slot 124 of each tracking assembly 112. The sleeves 170 are rotatably mounted to the spindle 171 with radial bearings 172 and thrust bearing 173 located in the confines of the spindle for reducing wear. Like the idler pulley assembly 40, the outer end of each sleeve 170 is formed with a pair of opposed flats 174 that are in co-planar spaced relationship to each other. However, one of the sleeves 170 has an open bore 176 extending along the sleeve's longitudinal axis for receiving a bearing or a bronze bushing 182. The bushing 182 receives a keyed shaft 178 that is operably coupled to the motor and the spindle 171 for rotation of the spindle. In an embodiment, the shaft 178 is frictionally secured to the spindle 171 by press fitting.

Each sleeve 170 is received within the elongated guide slot 124 of an associated tracking assembly 112 with the flats 174 being slidingly engaged by the parallel side surfaces 125 of the elongated opening 122 in the outer plate 114. Moreover, the portion of the sleeve's arcuate outer surface between the flats 174 and the spindle 171 are slidingly engaged by parallel side surface of the opening 122 in the inner plate 116.

The sleeve 170 of each tracking assembly 112 is abutted by the concave end of an associated slide plate 130.

Accordingly, movement of each slide plate 130 within each tracking assembly 112 results in like movement of one end of the drive pulley assembly 41. Therefore, rotation of both cams 144 moves the spindle 171 for adjusting the tracking of the belt 42 without changing the overall length of the conveyor.

Figure 12:
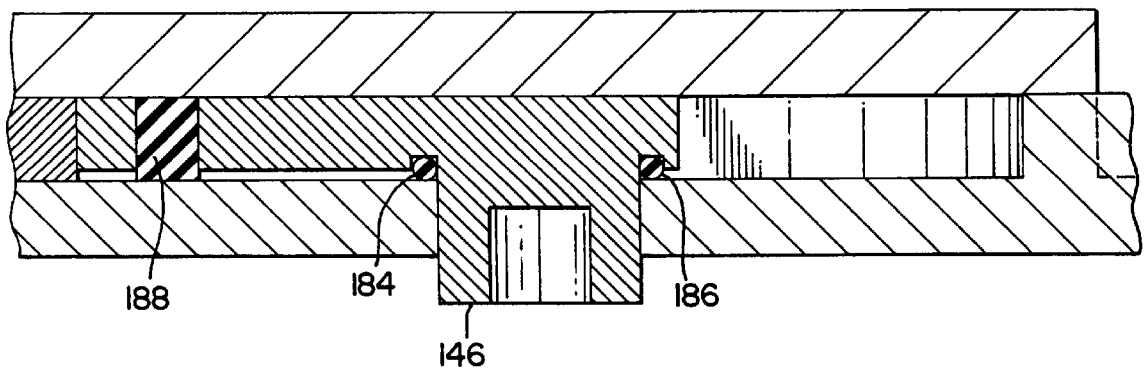
FIG. 12 is a cross-sectional view of an alternative embodiment of the tracking assemblies of FIG. 1.

As shown in FIG. 11, a seat 184 can be provided in the channel 128 of the outer plate 114 about opening 120. An o-ring 186 can be received within the seat 184 and about the pivot 146 of the cam 144 for frictionally damping rotation of the cam. Alternatively, if desired, the seat 184 can be provided by the cam 114 about the pivot 146 as shown in FIG. 12. Moreover, a length of plastic, rubber, or other like material 188, such as POLYCORD, (Reinach-Basel Switzerland Corporation, Switzerland) can extend through an open bore in the cam 144 for frictionally sliding along the surface of the channel 128.

While the specific embodiments have been illustrated and described, numerous modifications come to mind without significantly departing from the spirit of the invention and the scope of protection is only limited by the scope of the accompanying claims.

What is claimed is:

1. A device mounted to a conveyor for selectively positioning a pulley comprising:

an assembly defining a passage and an elongated opening, the passage having a pair of parallel side walls and a pair of parallel longitudinal walls extending perpendicularly in relation to the side walls;

a slide plate slidably mounted within the passage and having a distal end; and a thumb wheel operably connected to the assembly for reciprocally advancing the distal end of the slide plate into the elongated opening by a select distance.

2. The device of claim 1 wherein a locking device is operably connected to the assembly for securing the position of the distal end within the opening.

3. The device of claim 1 wherein the assembly includes a plurality of plate members wherein at least one of the plate members adjoins an elongated side rail of the conveyor and another one of the other plate members is attached to the side rail.

4. The device of claim 3 wherein at least one of the plate members defines an aperture for receiving a portion of the thumb wheel member.

5. The device of claim 1 wherein the thumb wheel is threadingly coupled to a shaft operably connected to at least one of the plate members.

6. The device of claim 1 wherein the thumb wheel is sandwiched between a pair of washers.

7. The device of claim 6 wherein the washers are received by a clip.

8. The device of claim 1 wherein the slide plate includes a concave distal end abutting against the pulley.

9. The device of claim 3 wherein at least one of the plate members includes a pair of lips within the channel and about the opening.

10. The device of claim 1 wherein the pulley adjoins the slide plate and an endless conveyor belt is trained over the pulley, the conveyor belt providing an upper conveyor surface that is constant in length.

11. The device of claim 1 further including another device mounted to the conveyor for selectively and independently positioning the pulley.

12. A device mounted to a conveyor for selectively positioning a pulley along a longitudinal axis defined by a pair of side rails comprising:

a pair of assemblies with each assembly attached to one of the side rails and including a pair of plate members attached together and defining a cavity and an elongated opening, one of the plate members abutting against one of the side rails and the other plate member attached to the side rail, the cavity having a pair of parallel side walls and a pair of parallel longitudinal walls extending perpendicularly in relation to the side walls;

a slide plate mounted within the cavity and having a concave distal end abutting one end of the pulley; and a thumb wheel operably connected to at least one of the plate members for longitudinally advancing the slide plate and one end of the pulley by a select distance.

13. The device of claim 12 wherein at least one of the plate members defines an aperture for receiving a portion of the thumb wheel.

14. The device claim 12 wherein the thumb wheel is threadingly coupled to a shaft operably connected to at least one of the plate members.

15. The device of claim 12 where the thumb wheel is positioned between a pair of washers.

16. The device of claim 15 wherein the washers and the thumb wheel are received by a clip.

17. The device of claim 12 wherein the pulley adjoins the slide plate and an endless conveyor belt is trained over the pulley, the conveyor belt providing an upper conveyor surface that is constant in length.

18. The device of claim 12 further including another device mounted to the conveyor for selectively and independently positioning the pulley.

19. A device mounted to a conveyor for selectively positioning a pulley along a longitudinal axis defined by a pair of side rails comprising:

a pair of assemblies with each assembly attached to one of the side rails and including a pair of plate members attached together and defining a cavity and an elongated opening, one of the plate members abutting against one of the side rails and the other plate member attached to the side rail, at least one of the plate members defining an aperture, the cavity having a pair of parallel side walls and a pair of parallel longitudinal walls extending perpendicularly in relation to the side walls;

a slide plate mounted within the cavity and having a concave distal end abutting one end of the pulley; and a thumb wheel having a portion received in the aperture defined by at least one of the plate members for longitudinally advancing the slide plate and one end of the pulley by a select distance.

20. The device of claim 19 wherein the pulley adjoins the slide plate and an endless conveyor belt is trained over the pulley, the conveyor belt providing an upper conveyor surface that is constant in length.

21. The device of claim 19 further including another device mounted to the conveyor for selectively and independently positioning the pulley.

* * * * *